US008203715B2

(12) United States Patent
    Robinson

(10) Patent No.: US 8,203,715 B2
(45) Date of Patent: Jun. 19, 2012

(54) KNOWLEDGE BASED SPECTROMETER

(75) Inventor: Ian S. Robinson, Redondo Beach, CA (US)

(73) Assignee: Raytheon Company, Waltham, MA (US)

(*) Notice: Subject to any disclaimer, the term of this patent is extended or adjusted under 35 U.S.C. 154(b) by 243 days.

(21) Appl. No.: 12/466,161

(22) Filed: May 14, 2009

(65) Prior Publication Data

US 2010/0290053 A1    Nov. 18, 2010

(51) Int. Cl.
    *G01B 9/02* (2006.01)
(52) U.S. Cl. ........................................................ 356/451
(58) Field of Classification Search .................. 356/451; 250/339.07–339.09; 382/280
    See application file for complete search history.

(56) References Cited

U.S. PATENT DOCUMENTS

| 5,248,882 | A | * | 9/1993 | Liang .............................. 250/291 |
| 5,311,445 | A | * | 5/1994 | White .............................. 702/28 |
| 5,784,162 | A | | 7/1998 | Cabib et al. |
| 5,870,193 | A | * | 2/1999 | Sumiya et al. ................. 356/451 |
| 6,005,664 | A | | 12/1999 | Korenberg et al. |
| 7,161,679 | B2 | | 1/2007 | Messerschmidt et al. |
| 2006/0241491 | A1 | * | 10/2006 | Bosch-Charpenay et al. .............................. 600/473 |
| 2009/0018786 | A1 | | 1/2009 | Munteanu et al. |

FOREIGN PATENT DOCUMENTS

WO            01/06209 A1    1/2001

OTHER PUBLICATIONS

M. W. Kelly, et al. "A Method for Correcting Fourier Transform Spectrometer (FTS) Dynamic Alignment Errors"; Algorithms and Technologies for Multispectral, Hyperspectral, and Ultraspectral Imagery X; Proceedings of SPIE, vol. 5425; Bellingham, WA; 2004.
John Browning, "Approximating Signals From Nonuniform Continuous Time Samples at Unknown Locations"; IEEE Transactions on Signal Processing, vol. 55, No. 4; Apr. 2007.
International Search Report/Written Opinion dated May 21, 2010 of PCT/US2010/024189 filed Feb. 12, 2010 (16 pages).
Intl. Preliminary Report on Patentability dated Jul. 21, 2011 of PCT/US2010/024189 filed Feb. 12, 2010 (18 pages).

* cited by examiner

*Primary Examiner* — Tarifur Chowdhury
*Assistant Examiner* — Jonathon Cook
(74) *Attorney, Agent, or Firm* — Pierce Atwood LLP; Joseph M. Maraia, Esq.

(57) ABSTRACT

A sensor and method for remotely determining a presence of a particular substance based on spectral data of the particular substance is disclosed. The sensor includes a sampling module configured to detect radiation from a particular substance using an interferometer, wherein the sampling module includes a control module that is configured to guide and measure spacing of samples taken by the sampling module; a focal plane module configured to detect and convert an interference pattern produced by the interferometer into a series of digital samples; a reference spectra modification module configured to modify reference spectra by modifying according to the measured spacing of samples and an instrument line shape of the sampling module; an estimation module configured to receive the converted series of digital samples and transform the non-uniformly spaced digital samples into frequency space using band centers determined from reference spectra as modified by the instrument line shape of the sampling module; a comparison module configured to compare the transformed digital samples against a database of known chemical signatures; and a determination module configured to determine the presence of the particular substance based on the results of the comparison.

13 Claims, 4 Drawing Sheets

KNOWLEDGE BASED SPECTROMETER

BACKGROUND

This disclosure relates generally to the field of interferometers, more specifically, to the construction and arrangement of a system and method of interferometers for use as spectrometers, such as Fourier transform spectrometers.

There are a wide range of applications for sensors that remotely detect the presence of chemicals and other materials including monitoring pollutants, monitoring climate change, and detection of toxins. One type of sensor, called a Fourier Transform Spectrometer (FTS), supplies spectral data for all these applications. The FTS comes in non-imaging and imaging variants that collect samples of the auto-correlation of the incoming light. The most common form of the FTS employs a Michelson interferometer with one variable length arm. Many variants of these exist yet they all require very precise control of the position of the variable arm, around $1/20^{th}$ of a wavelength. The control system responsible for this precision can be the most expensive and least robust part of the system, especially for short wavelength (e.g. UV, VIS, NIR) sensors. These sensors all utilize the Discrete Fourier Transform (DFT) or its faster algorithm, the Fast Fourier Transform (FFT) to convert the auto-correlation (each spectral amplitude encoded as the amplitude of a cosine signal) to physical spectra. The FFT is efficient when large sample sets must be processed but produces artifacts if the variable arm is not precisely controlled, providing uniformly spaced samples. It also requires that the entire spectrum be computed at once despite the fact that most spectral targets can be detected using only a few spectral samples or subsets of the spectrum. The DFT/FFT have limited spectral range due to aliasing effects and once the band center is set in one part of the spectrum it cannot be modified elsewhere without recomputing the entire FFT. The spectra computed from DFT/FFT cannot independently change band centers, bandwidths, and line shapes.

SUMMARY

In accordance with various embodiments of this disclosure, a sensor for remotely determining a presence of a particular substance based on spectral data of the particular substance is disclosed. The sensor comprises a sampling module configured to detect radiation from a particular substance using an interferometer, wherein the sampling module includes a control module that is configured to guide and measure spacing of samples taken by the sampling module; a focal plane module configured to detect and convert an interference pattern produced by the interferometer into a series of digital samples; a reference spectra modification module configured to modify reference spectra by modifying according to the measured spacing of samples and an instrument line shape of the sampling module; an estimation module configured to receive the converted series of digital samples and transform the non-uniformly spaced digital samples into frequency space using band centers determined from reference spectra as modified by the instrument line shape of the sampling module; a comparison module configured to compare the transformed digital samples against a database of known chemical signatures; and a determination module configured to determine the presence of the particular substance based on the results of the comparison.

In accordance with various embodiments of this disclosure, a method for remotely determining a presence of a particular substance based on spectral data of the particular substance is disclosed. The method comprises sampling radiation transmitted, reflected, and/or emitted from a particular substance, at a particular sampling interval, using an interferometer; converting an interference pattern produced by the interferometer into a series of digital samples; modifying reference spectra by both the spacing of measured samples and an instrument line shape of the interferometer; transforming the converted series of non-uniformly spaced digital samples into frequency space using band centers determined from the instrument line shape of the interferometer; comparing the transformed digital samples against a database of known chemical signatures; and determining the presence of the particular substance based on the results of the comparison.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

DETAILED DESCRIPTION

Figure 1:
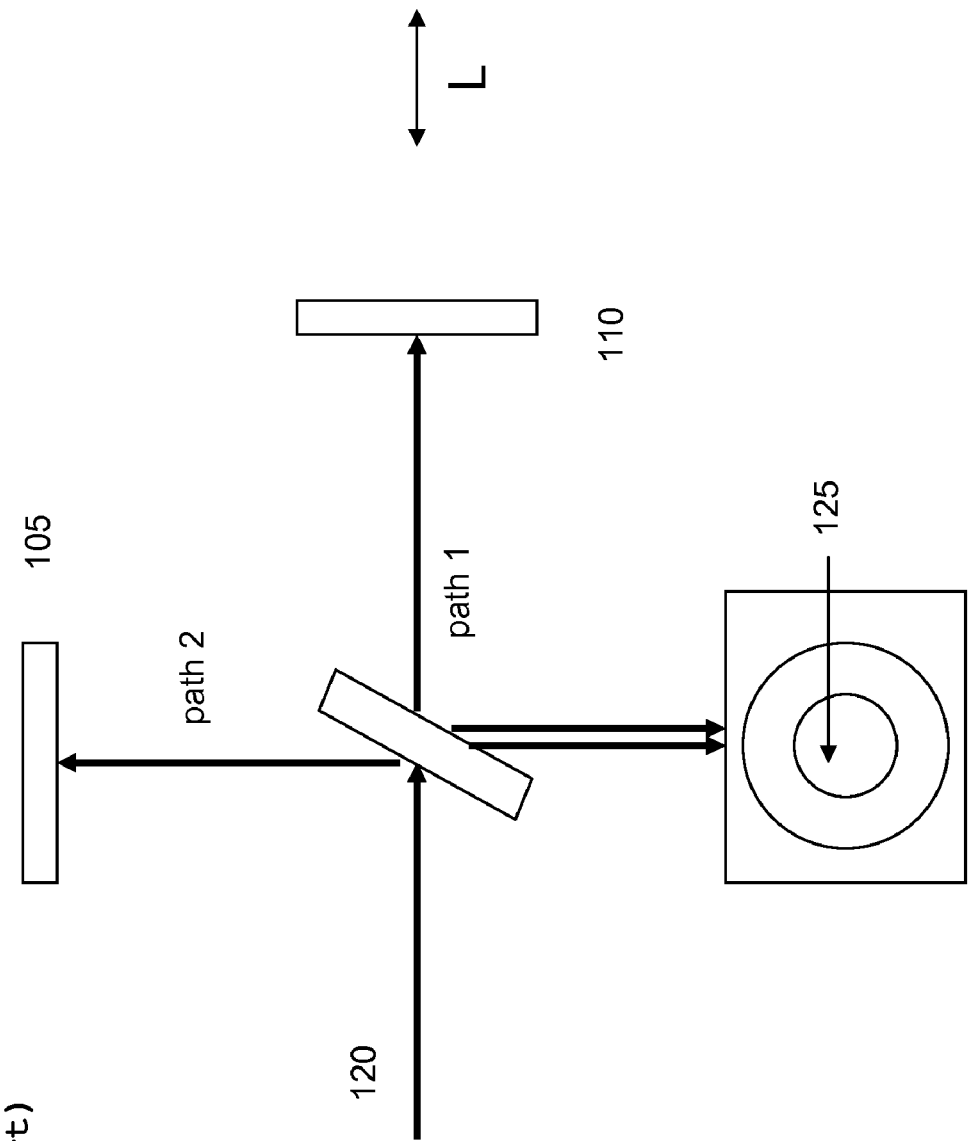
FIG. 1 shows a conventional Fourier Transform Spectrometer (FTS) using a scanning Michelson interferometer.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments, and/or in combination with, or instead of, the features of the other embodiments.

The present disclosure combines an interferometric spectrometer with dynamic knowledge of the interferometer sampling and settings, along with novel signal processing to extract spectral features from an interferogram without the need to precisely control the variable arm, with the ability to optimally control the number of, spacing of, and band centers of extracted spectra, with greater spectral range than prior systems and with less susceptibility to artifacts resulting from imperfect sample spacing. The result is a sensor that has higher performance in most categories than conventional sensors and can be constructed for lower cost.

The spectral data of interest may be encoded in superposition of cosinusoids of many frequencies that are sampled in a non-uniform manner. The amplitude of each cosinusoid corresponds to the power in a spectral element. The present disclosure employs a sampling pattern that is quasi-random or deliberately timed to achieve specific spacing of the spectral components. The non-uniform spacing is carefully measured but controlled with much less precision than conventional systems. This sampling scheme provides superior spectral range and spectral resolution compared to conventional systems.

Prior art estimates of these cosinusoids utilize DFT/FFT. The DFT/FFT results in artifacts when the input samples are not uniformly spaced. The DFT/FFT also computes the amplitudes of N cosinusoids when N samples are tested. In accordance with various aspects of the present disclose, the amplitudes of the cosinusoids are estimated only at frequencies of interest using an estimation technique, such as a least squares approximation. The present disclosure is enabled to generate a full spectrum or directly test for the presence of known substances, chemicals and materials by using spectral reference data, adjusting, by knowledge of the interferometer settings, to tailor the number of and center frequency(ies) (or wavelength(s)) used for each estimation. Moreover, the present disclosure is enabled to jointly estimate the amplitude of multiple cosinusoids associated with a particular substance, chemical or material.

The non-uniform spacing enables fewer samples to cover a spectral range without aliasing and introduces less noise from detector readouts. The tailored central wavelength or frequency provides up to 50% more signal at a given spectral element. These performance factors, and the avoidance of crucial sampling artifacts, provide superior detection of small quantities of target compared to conventional systems.

A conventional Fourier Transform Spectrometer (FTS) splits an incoming scene into two parts and then recombines them after one part undergoes a different propagation length (optical path distance (OPD)). Most of these conventional systems use a moving part to introduce the variable OPD and some sample the interferogram at many spatial locations, each having a different OPD. Many types of interferometers have been employed in FTS designs including Michelson, Sagnac and Mach-Zehnder. The development of the Cooley-Tukey algorithm (Fast Fourier Transform (FFT)) and the microprocessor has enabled real-time or near real-time computations of spectra using interferometic techniques.

FIG. 1 illustrates a conventional FTS using a scanning Michelson interferometer. A FTS is a Michelson interferometer with a movable mirror. By scanning the movable mirror over some distance, an interference pattern or interferogram is produced that encodes the spectrum of the source. The encoded spectrum is the Fourier transform of the source. In its simplest form, a Fourier transform spectrometer consists of two mirrors 105, 110 located at right angles to each other and oriented perpendicularly, with a beamsplitter 115 placed at the vertex of the right angle and oriented at a 45° angle relative to the two mirrors 105, 110. As shown in the Figure, the beamsplitter 115 is half-silver mirror; however, the beamsplitter can be any optical element that is configured to allow part of an electromagnetic wave to pass through while reflecting the other part. As shown in the Figure, mirror 105 is a fixed mirror and mirror 110 is a movable mirror. Radiation 120 incident on the beamsplitter 115 from a radiation source (not shown) is divided into two parts, each of which propagates down one of the two arms and is reflected off one of the mirrors. As shown in FIG. 1, path 1 represents the portion of the radiation incident onto mirror 110 and path 2 represents the portion of the radiation incident onto mirror 105. The two beams are then recombined. When the position of one of the mirrors is varied along the axis of the corresponding arm, an interference pattern 125 is swept out as the two phase-shifted beams interfere with each other. Mirror 110 is configured to move from its initial position to distance L to the right along an axis co-linear with the path 1. This lateral movement produces the optical path distance (OPD). In the present disclosure, the distance L is represented in centimeters.

With a scene composed of monochromatic input light of wavelength λ or wavenumber ν (ν=1/λ), the recombination of the two waves leads to an interference effect. The amplitude A of the output wave depends on the phase difference α between the two waves, which in turn depends on the instantaneous OPD x. This is shown in equation 1.

$$A = 2\alpha \cos(\pi \nu x) \tag{1}$$

The light intensity I(x) is proportional to the square of the amplitude as shown in equation 2.

$$I(x) = 2\alpha^2 (1 + \cos 2\pi \nu x) \tag{2}$$

Examining a continuous spectrum S(ν) rather than the monochromatic wave, we can express the intensity of the interferogram as a function of the OPD, I(x), using equation 3.

$$I(x) = \frac{1}{2} \int_{-\infty}^{\infty} S(\nu)(1 + \cos(2\pi \nu x)) \, d\nu \tag{3}$$

The signal of interest is a cosine wave of unknown phase. The most common method to extract these signals is to decompose equation 2 into the sum of a constant term and the real part of the Direct Fourier Transform (DFT) of S(ν). The FFT is an algorithm that provides efficient implementation of the DFT. A number of different variants of the FFT exist to handle any size data set that must be transformed. However, the FFT/DFT has some limitations for processing interferometric data. If the samples input to the algorithm are not equally spaced in time or if the gain (modulation) of the sensor is not constant over the period of collection than very significant errors can result.

Figure 2:
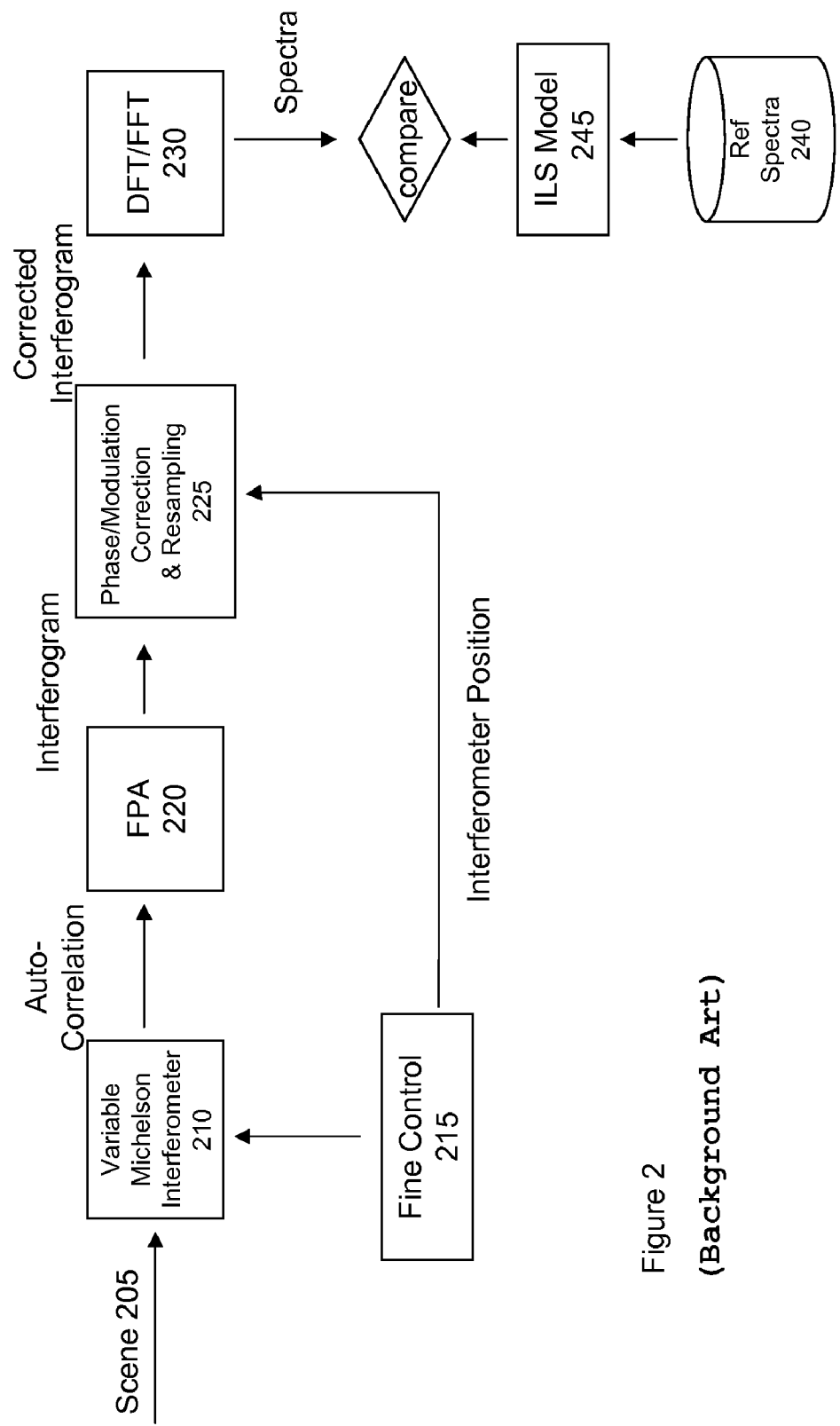
FIG. 2 shows a block diagram of a conventional FTS.

A functional block diagram of a conventional sensor system is shown in FIG. 2. A scene 205 enters the sensor system 200 and is transmitted via optics (not shown) to an interferometer 210, such as the conventional Michelson interferometer of FIG. 1. As discussed above in relation to FIG. 1, the scene energy is split into two segments, which are recombined. One arm of the interferometer introduces a varying OPD. A fine control module 215 ensures the OPD is varied in uniform steps, of size S, at each time sample. Mirror 110 moves from position zero to L. The result of the recombination is the interference pattern or interferogram 125. Signals are collected by a Focal Plane Assembly (FPA) 220, which provides at least 2 L/S digital samples of the interferogram 125. The FPA can include a set of photo-detector elements and corresponding electronics arranged at or near the focus of the interference pattern. For example, the set of photo-detectors elements can be arranged as a linear array or in a two-dimensional matrix. The digital data are preprocessed by a phase/modulation correction and resampling module 225 to ensure no data is missing or contains spikes. Variations in gain/modulation or offset of the sensor are corrected to the best degree possible. The data may be re-sampled to ensure that they are optimally aligned in phase and time. The re-sampled corrected data are typically windowed (apodized) and sent to a FFT module 230 that is encoded with the FFT algorithm that produces spectra 235. The best spectral resolution of this conventional sensor is $1/L$ cm$^{-1}$, and the free spectral range is $1/2S$ cm$^{-1}$, where S and L are measured in centimeters.

The fine control module 215 includes a laser reference that is passed through the interferometer 210. The reference employs a wavelength well away from the spectral range being measured, and may even be detected on a unique detector. The fringe count of the reference is used to measure OPD. A reference can also be employed to measure the tilt of the optics in the interferometer.

The spectra are computed across the entire spectral range on a uniform grid of wavelength samples (which may or may not be centered on the physical features of interest). The DFT/FFT introduces an Instrument Line Shape (ILS) that is dominantly the Fourier Transform of the apodization shape applied. These spectra are compared to reference spectra 240 that are convolved with the ILS model in ILS module 245. ILS defines the band shape and band center of each spectral element. For example, the instrument line shape function of a monochromator (often called the spectral slit function) operating above the diffraction limit is a triangle, whereas in the diffraction-limited case it is $sinc^2$ ($[sin\ x]^2/x^2$) function. For Fourier transform infrared (FT-IR) spectrometers, the instrument line shape function is a sinc ($[sin\ x]/x$) function unless the interferogram is multiplied by an apodization function. In this case, the instrument line shape function is the Fourier transform of the apodization function. Common apodization functions include the triangular function and the three Norton-Beer functions.

In real-world systems, the ILS is also impacted by a number of phenomena including re-sampling errors, jitter in the interferometer that causes sample errors and/or tilting of optical elements, and by differences in the interferometer settings during the motion of the mirror in the two respective directions. In most conventional systems, the ILS is predicted and any differences between the prediction and the realization of either band shape or band center contribute to mismatches when the data is compared to reference spectra. Some shifting of the band centers can be done in post-processing using timing data and/or spectral calibration.

Conventional systems using the Fourier Transform to extract cosinusoid amplitude are susceptible to a number of errors and artifacts. In these conventional systems, the interferogram is sampled at regular time intervals, but because of mechanical errors or vibrations, the spacing of OPD is irregular. The typical system tries to control OPD to $\frac{1}{20}^{th}$ of a wavelength to keep sampling artifacts at a benign level. This is challenging for infrared sensors and more difficult for those operating in the visible and ultraviolet portions of the spectrum.

Some conventional systems measure the instantaneous OPD and trigger (asynchronous) samples to be collected at uniform OPD spacing. This variant avoids the artifacts associated with improper sampling but introduced numerous other complications of time tagging and merging asynchronous and synchronous operations. It also requires much wider (order of magnitude) bandwidth electronics to control the interferometer and process data.

Figure 3:
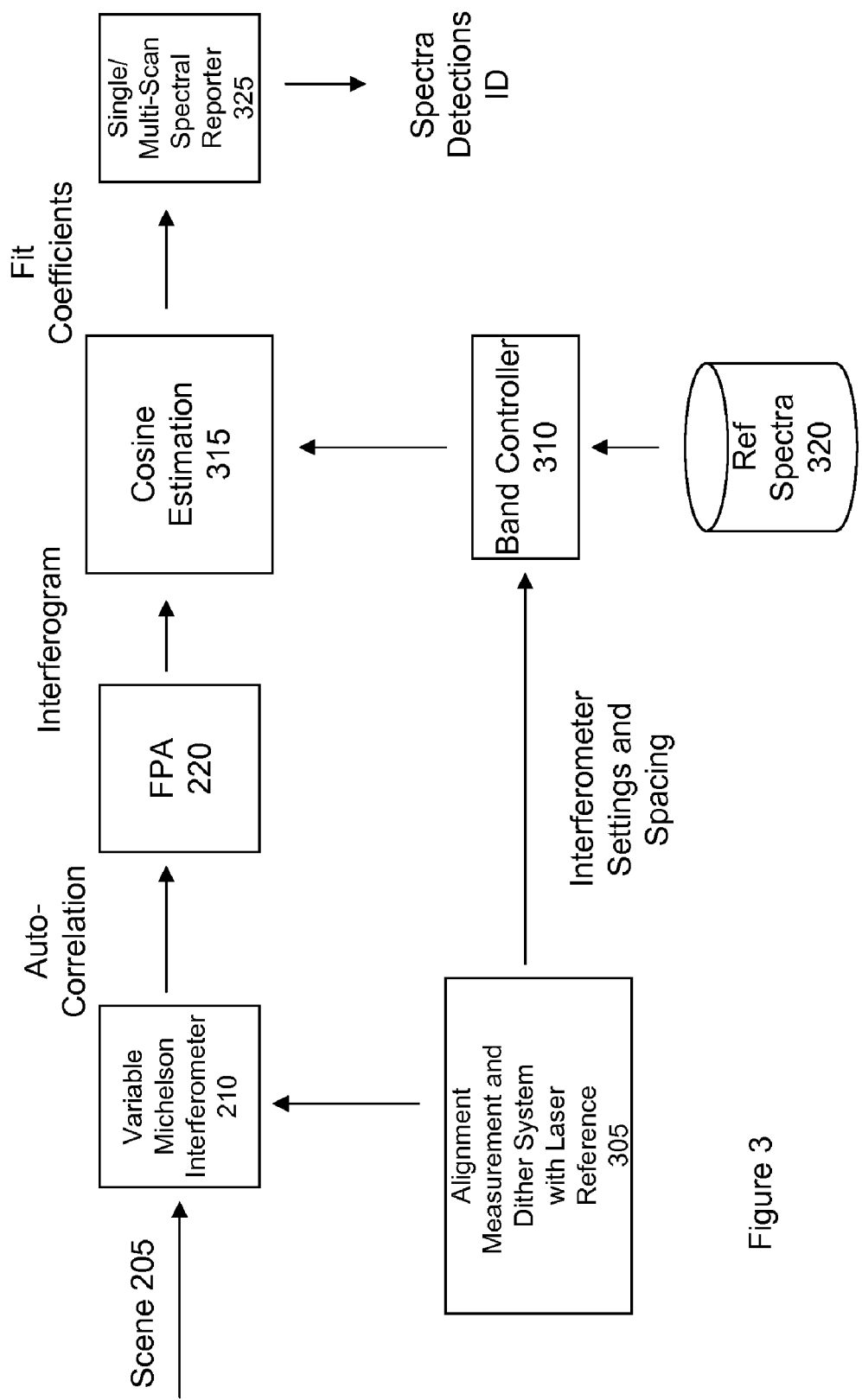
FIG. 3 shows a FTS in accordance with an aspect of the present disclosure.

FIG. 3 shows an aspect of the present disclosure that combines an interferometric spectrometer with dynamic knowledge of the interferometer sampling and settings along with novel signal processing to match spectral features directly in an interferogram. Variable interferometer module 210 and focal plane assembly (FPA) 220 are common with the conventional system of FIG. 2. Alignment measurement and dither system with a laser reference module 305, band controller module 310, cosine estimation module 315, reference spectra database 320 and single/multi-scan spectral reporter module 325, discussed in detail below, are unique to the present disclosure and provides a superior alternative to conventional FTS sensors. In some aspects of the present disclosure, these modules could be "retrofitted" to existing FTS systems to improve their performance.

As shown in FIG. 3, the OPD and (optionally) the tilt of the interferometer are measured by the alignment measurement and dither system 305. The measured OPD (and if measured, the tilt) of the interferometer is then transmitted to the band control module 310. The band control module 310 uses the information on the position of the interferometer to select the centers of samples that will be used in the cosine estimation module 315. The tilt of the optics and/or the modulation of the interferogram are measured and sent to the band control module 310. The band control module 310 computes an ILS according to the tilt, modulation, and jitter as measured in the system.

A series of cosine estimations is performed by the cosine estimation module 315 in the neighborhood of the reference's wavelength to empirically assess the ILS and any unexpected spreading of the monochromatic signal. The estimations also indicates the creation of any secondary signals, such as harmonics, ghosts, etc. In one mode, the modulation is corrected using conventional techniques, such as Mooney and Kelly techniques which requires only the time-dependent wavefront angle, sampled coincidentally with the interferogram, and the second derivative of the erroneous interferogram as inputs to compute the correction. See, Kelly and Mooney ("A Method for Correcting Fourier Transform Spectrometer (FTS) Dynamic Alignment Errors," in Algorithms and Technologies for Multispectral, Hyperspectral, and Ultraspectral Imagery X, Proceedings of the SPIE, Vol. 5425, edited by Sylvia S. Shen and Paul E. Lewis, 2004, which is hereby incorporated by reference. In another mode, the interferogram is inversely re-modulated using the moving window modulation. In an aspect of the present disclosure, these two techniques can be combined in series.

The band control module 310 is configured to read spectral data from a spectral reference database 320. The reference spectra are convolved with either the predicted ILS or the computed ILS. The output of the convolution is used by the band control module to select band centers for cosine estimation. These band centers can be anywhere in the spectral range of the sensor. In an aspect of the present disclosure, the band control module 310 is configured to select one or more band centers to be tested where there is appreciable absorption or emission for each chemical or material of interest. In contrast to the conventional FTS, these band centers can be located anywhere, and can over sample the ILS to any degree. This is useful for deconvolving the ILS and for centroiding measured features. One benefit of this approach is that locating band centers where spectral peaks are expected improves performance.

In an aspect of the present disclosure, searches in the neighborhoods of strong peaks can be performed to determine whether the actual peak has been found or if there is a spectral calibration error.

Once the band centers are selected, then the cosine estimation (CE) module 315 is configured to use one of a family of techniques to estimate the amplitude of the cosinusoid at that frequency. The techniques include a linear or non-linear least-squares analysis and digital heterodyning. In the digital heterodyning technique, two orthogonal cosines that are 90 degrees out of phase are multiplied with the measured interferogram samples. The products are essentially correlation coefficients and are, in turn, added in quadrature to complete the estimate of the amplitude. In this approach, the cosinusoids are compared at the known (measured) OPD sample spacing. Thus, only knowledge, rather than control, of the sampling is needed. There are, at a minimum, substantially less sample errors corresponding to the problems experienced using the conventional DFT/FFT.

In an aspect of the present disclosure, the interferometer is configured to dither the position to ensure that the samples are not equally spaced in OPD. This sampling scheme improves the free spectral range or reduces the number of samples required to avoid aliasing. It can also improve the spectral resolution.

In an aspect of the present disclosure, the dither system is configured to deliberately provide unique sample spacing on a series of scans. The spectral reporter module 325 is configured to combine data from multiple scans and refines the estimates of amplitude. Employing different sample spacing on subsequent scans further improves spectral range and spectral resolution.

Another performance benefit of the present disclosure is the joint estimation of two or more cosinusoids at one time. The band control module 310 is configured to select two or more band centers to transmit to the CE module 315 along with a constraint on their relative amplitude(s). The CE module 315 will find the optimal estimate of amplitudes at each band center subject to the constraint. This puts the detection and identification function to use directly in the processing of the interferogram. The performance benefit of this technique should range from 10-50% improvement in the standard deviations of the retrieved amplitudes. In another mode, the CE module 315 is configured to detect individual spectral elements of a target material. If the confidence of the detection is low or if the user wishes to quantify the amount of target present, then the joint estimation is employed.

Figure 4:
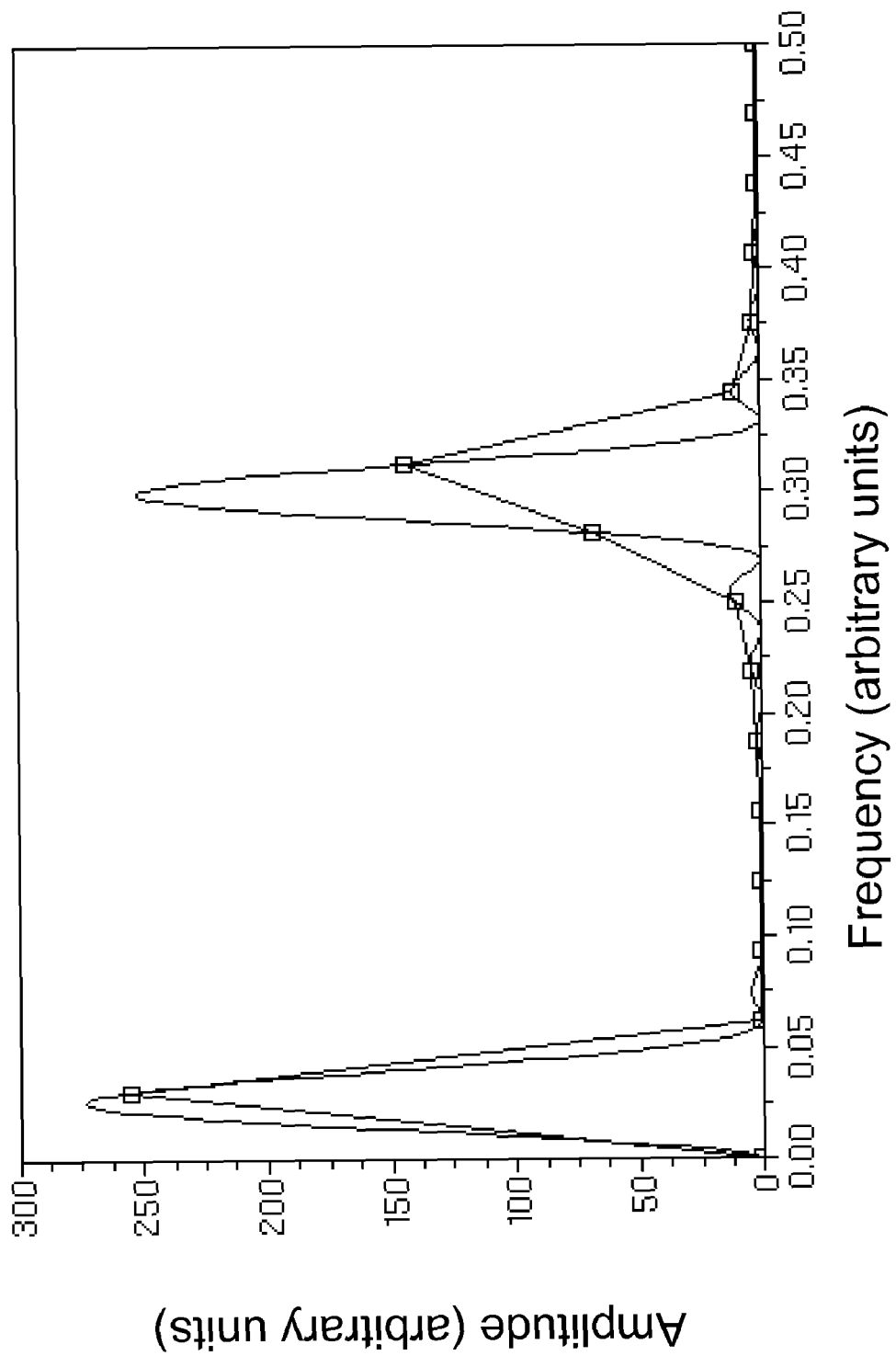
FIG. 4 shows a representative comparison of two spectral peaks sampled by a conventional FTS and with a FTS in accordance with an aspect of the present disclosure.

FIG. 4 shows a representation of two spectral peaks sampled by a conventional FTS and an interferometer in accordance with an aspect of the present disclosure. The amplitude computed using DFT/FFT with fixed band spacing is close to the peak on the left (as represented by a smooth curve having no markers for the data set). On the right, the energy of the peak is split between two samples (as represented as the data set having square markers). The energy is preserved in both cases but the number of (weighted) samples used to compare measurements to references will be greater for the conventional FTS, introducing significantly more noise. One benefit of this approach is that it provides higher confidence detections of spectral features.

The disclosure above is described using discrete modules; however, the disclosure is not so limiting. More or less modules may be used, and different module functionality may be combined into a single module.

Although the above disclosure discusses what is currently considered to be a variety of useful embodiments, it is to be understood that such detail is solely for that purpose, and that the appended claims are not limited to the disclosed embodiments, but, on the contrary, is intended to cover modifications and equivalent arrangements that are within the spirit and scope of the appended claims.

What is claimed is:

1. A method for remotely determining a presence of a particular substance based on spectral data of the particular substance obtained by a spectrometer comprising an interferometer, the method comprising:
    using the interferometer to form an interference pattern resulting from an interaction of radiation with the particular substance;
    sampling, at the interferometer, the interference pattern to generate a plurality of measured samples having a measured sample spacing associated therewith;
    reading reference spectral data from a spectral reference database;
    using cosine estimation at the measured sample spacing for determining amplitudes associated with frequencies uniquely associated with features of spectral data in the plurality of measured samples;
    modifying the reference spectral data by selecting a plurality of band centers for the reference spectral data;
    comparing the modified reference spectral data with the determined spectral data from the cosine estimation; and
    determining a presence of the particular substance based on results of the comparing.

2. The method according to claim 1, wherein the particular substance includes chemical elements and molecular compounds.

3. The method according to claim 1, wherein the sampling includes measuring movement of the interferometer by a reference beam.

4. The method according to claim 3, wherein the reference beam is a laser.

5. The method according to claim 3, wherein the measured movement includes a tilt of an optical axis in the interferometer, a modulation in the interference pattern, and a jitter in the interferometer.

6. The method according to claim 5, wherein the modulation is measured as a fringe count of the reference beam.

7. The method according to claim 1, wherein multiple scans are combined with different sample spacings.

8. The method according to claim 1, wherein spectra of received radiation is computed with greater spectral resolution, improved free spectral range and with fewer artifacts.

9. The method according to claim 1, wherein spectra of received radiation is produced without comparisons to a reference spectra.

10. The method according to claim 1, wherein spectra of received radiation is produced from a single scan and/or from multiple scans.

11. The method of claim 1,
    wherein the modifying the reference spectral data is based upon the cosine estimation of the plurality of measured samples.

12. The method of claim 1 further comprising:
    computing, at the spectrometer, an instrument line shape based on at least one of a tilt, a modulation, and a jitter of the interferometer.

13. The method of claim 1, wherein the using the cosine estimation comprises using at least one of a non-linear least squares analysis and a digital heterodyning technique.

* * * * *